(12) United States Patent  (10) Patent No.: US 7,711,591 B2
Wolfe et al.  (45) Date of Patent: May 4, 2010

(54) METHOD AND APPARATUS FOR PROVIDING VIRTUAL CAPACITY TO A PROVIDER OF SERVICES

(75) Inventors: Chris A. Wolfe, Rancho Santa Fe, CA (US); Michael L. Segal, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 508 days.

(21) Appl. No.: 11/492,630

(22) Filed: Jul. 24, 2006

(65) Prior Publication Data

US 2006/0265265 A1  Nov. 23, 2006

Related U.S. Application Data

(62) Division of application No. 10/000,247, filed on Oct. 29, 2001, now Pat. No. 7,212,984.

(51) Int. Cl.
 G06F 17/50 (2006.01)
(52) U.S. Cl. .......................................... 705/7
(58) Field of Classification Search ................. 705/7
 See application file for complete search history.

(56) References Cited

U.S. PATENT DOCUMENTS

| | | | |
|---|---|---|---|
| 4,928,274 A | 5/1990 | Gilhousen et al. | |
| 4,979,170 A | 12/1990 | Gilhousen et al. | |
| 5,017,926 A | 5/1991 | Ames et al. | |
| 5,593,706 A | 1/1997 | Patel | |
| 5,880,958 A | 3/1999 | Helms et al. | |
| 5,920,846 A | 7/1999 | Storch et al. | |
| 6,032,184 A | 2/2000 | Cogger et al. | |
| 6,070,007 A | 5/2000 | Doyle | |

(Continued)

FOREIGN PATENT DOCUMENTS

WO  9906934  2/1999

(Continued)

OTHER PUBLICATIONS

Jacobs et al (The application of a Novel Two-way Mobile Satellite Communications and Vehicle Tracking System to the Transportation Industry), Feb. 1991, IEEE Transactions on Vehicular Technology, vol. 40 No. 1, pp. 1-7.*

(Continued)

*Primary Examiner*—Romain Jeanrty
(74) *Attorney, Agent, or Firm*—Richard A. Bachand; Ashish L. Patel

(57) ABSTRACT

Method and apparatus for providing virtual capacity to a service provider. A service provider contacts a third party service provider when the service provider can not perform services for a customer. A solicitation is sent by the service provider and accepted by the third party service provider. After acceptance, status and/or location information from the third party service provider is redirected within a network management facility so that the information is sent to the service provider, rather than to an entity normally associated with the third party service provider. After services have been performed by the third party service provider, the third party service provider is generally free to accept service requests from other service providers, whereby messages transmitted by the third party service provider are routed to the new service provider.

19 Claims, 4 Drawing Sheets

U.S. PATENT DOCUMENTS

| | | |
|---|---|---|
| 6,124,810 A | 9/2000 | Segal et al. |
| 6,260,062 B1 * | 7/2001 | Davis et al. ............... 709/223 |
| 6,334,133 B1 | 12/2001 | Thompson et al. |
| 6,349,306 B1 | 2/2002 | Malik et al. |
| 6,390,151 B1 * | 5/2002 | Christman et al. .......... 141/231 |
| 6,411,897 B1 | 6/2002 | Gaspard, II |
| 6,463,419 B1 | 10/2002 | Kluss |
| 6,609,051 B2 * | 8/2003 | Fiechter et al. ............... 701/33 |
| 6,749,122 B1 | 6/2004 | Koenck et al. |
| 6,785,718 B2 | 8/2004 | Hancock et al. |
| 6,922,133 B2 | 7/2005 | Wolfe |
| 7,058,508 B2 * | 6/2006 | Combs et al. ............... 701/213 |
| 2002/0010615 A1 * | 1/2002 | Jacobs ............... 705/9 |

FOREIGN PATENT DOCUMENTS

WO        0046728        8/2000

OTHER PUBLICATIONS

International Preliminary Examination Report—PCT/US02/034804—IPEA/US—Feb. 7, 2004.

Dialog "Rightfreight.com to Partner With NTE, Creating a Seamless Online Shipping Platform for Air and Ground Freight Worldwide". Feb. 2000; Business Wire, 1398; Dialog File 148, Accession No. 12124058.

Golob et al., "Freight Industry Attitudes Towards Policies to Recude Congestion" Nov. 1998; Transportation Research—Part-E: Logistics and Transport Review. 36: 55-77.

* cited by examiner

METHOD AND APPARATUS FOR PROVIDING VIRTUAL CAPACITY TO A PROVIDER OF SERVICES

CROSS-REFERENCE TO RELATED APPLICATIONS

The present application for Patent is a divisional and claims priority to patent application Ser. No. 10/000,247 entitled "Method and Apparatus for Providing Virtual Capacity to a Provider of Services" filed Oct. 29, 2001, now U.S. Pat. No. 7,212,984, and assigned to the assignee hereof and hereby expressly incorporated by reference herein.

BACKGROUND

1. Field of the Invention

The present invention relates generally to the service industry. More particularly, the present invention provides for a method and system for providing virtual capacity to a provider of services, such as freight delivery services.

2. Description of the Prior Art

The use of wireless communication systems is well known for transmitting information between fixed stations and one or more geographically dispersed mobile receivers. For example, satellite communication systems have been used in the trucking industry for many years to provide messaging and location information between fleet-owned dispatch centers and their respective tractor-trailer vehicles. Such systems offer significant benefits to fleet owners because they allow almost instantaneous communications and real-time position information. An example of such a satellite communication system is disclosed in U.S. Pat. No. 4,979,170 entitled "Alternating Sequential Half Duplex Communication System and Method"; U.S. Pat. No. 4,928,274 entitled "Multiplexed Address Control in a TDM Communication System"; and U.S. Pat. No. 5,017,926 entitled "Dual Satellite Navigation System"; U.S. Pat. No. 6,124,810 entitled "Method and Apparatus for Automatic Event Detection in a Wireless Communication System," all assigned to the assignee of the present invention and all incorporated herein by reference thereto as if repeated verbatim immediately hereinafter.

In the satellite communication system described by the above-mentioned patents, fleet-owned dispatch centers communicate using land-based systems such as telephone or fiber-optic networks to a hub, otherwise known as a network management facility (NMF). The NMF acts as a central communication station through which all communications between vehicles and dispatch centers pass. The NMF comprises a number of network management computers (NMCs), each NMC responsible for providing a communication path from the NMF to geographically dispersed vehicles in the communication system using a geosynchronous satellite. The geosynchronous satellite comprises one or more transponders, which are electronic circuits well known in the art for relaying high frequency satellite communication signals between remote locations. Each NMC is assigned an individual transponder, with each transponder operating at a unique frequency in order to avoid interference with communication signals on other transponders. In the satellite communication system of the above-referenced patents, each transponder is capable of handling the communications needs of approximately 30,000 vehicles. Each vehicle in the communication system is equipped with a transceiver, otherwise known as a mobile communication terminal (MCT), for communicating message and location information to a pre-designated NMC via the geosynchronous satellite.

In a typical transaction where trucking companies, or carriers as they are known, with the capability and flexibility to transport large amounts of goods to multiple destinations efficiently, a carrier is called upon to transport goods from one location to another by a customer, otherwise known as a shipper. Examples of shippers might include almost any manufacturer of goods. Sometimes a carrier will have a standing contract with a shipper to transport goods that the shipper desires to be transported. The shipper provides delivery instructions to the carrier comprising details of the shipment, including, for example, when and where to pick up the goods and where to ship them. Generally, these instructions pertaining to a shipment are provided to the carrier or its representative (e.g., a vehicle operator of carrier) in the form of a document commonly referred to as a "bill of lading." The bill of lading may also provide other pertinent information concerning the shipment, such as a description and quantity of the goods being shipped.

Many times a carrier will not have any available vehicles for transporting goods which a shipper desires to be shipped, especially a carrier that is obligated by contract to transport goods of a shipper. If a carrier does have an available vehicle, the capacity of the vehicle may be too small for the quantity of goods to be shipped. In any of these situations, the carrier will either have to inform the shipper that it cannot transport the goods, or hire a third party carrier to transport the goods. The latter alternative would be especially demanded of the carrier if the carrier had previously contracted with the shipper to transport goods belonging to the shipper.

After the goods have been assigned for transportation by a carrier to a third party carrier, the carrier needs to be kept apprised of various events throughout a typical delivery cycle. Typically, the carrier relies on a third party network management facility having an associated third party dispatcher for being kept informed of the status of goods being transported by a third party carrier. For example, upon arrival at a predetermined pickup destination, a truck driver of a vehicle for the third party carrier may contact a dispatch center associated with the third party carrier to alert the dispatch center of the time and location of arrival. It is then the responsibility of the third party dispatcher to inform the third party network management facility of this information, who in turn would then transmit the information to the carrier so that the carrier may furnish the information to the shipper. Similarly, after the truck of a third party carrier has been loaded at the pickup destination, the truck driver may send a message to the third party dispatch center indicating the time of departure, the location from where the departure occurred, and a description of the goods that are being transported. Another example where a vehicle operator for a third party carrier might transmit a status message to the third party dispatch center is when an unscheduled stop has been made and/or when the vehicle departs from the unscheduled stop. All of these possible events in a delivery cycle are important information that should be communicated to the carrier. Many times personnel in the third party network management facility and/or the third party dispatch center forget to transmit this information, or are tardy in doing same.

Although communications between drivers and dispatch centers and/or network management facilities have been made much more convenient and reliable using satellite or terrestrial-based communication systems, a variety of problems still persist in the reporting process. For example, a driver may forget to send a message upon arrival or departure from a planned pickup destination, causing confusion at the dispatch center as to the status of goods in transit. Or, a driver may send a message long after he has departed a pickup indicating that he is just now leaving the pickup location, to avoid possible negative consequences of forgetting to send a timely message. Furthermore, a driver may not wish to inform the dispatch center when making an unscheduled stop, for a variety of reasons. Thus, with respect to transportation information that should be transmitted to a carrier from a third party carrier, the carrier relies heavily on the third party dispatch center, on the network management facility, and on the third party truck driver. As previously indicated, because of the problems of relying on truck drivers, dispatch centers and/or network management facilities, a carrier may not be kept properly abreast of various events throughout a third party carrier delivery cycle.

Therefore, what is needed is a system and method that overcomes the deficiencies of a carrier relying on a third party service provider for information on goods being transported. What is more specifically needed is a system and method for a service provider to conveniently receive communications from a third party service provider while the services are being performed.

SUMMARY

The present invention is a method and apparatus for allowing a service provider to receive communications from a third party service provider while services are being performed by the third party service provider.

In accordance with one embodiment of the present invention, a method is provided for providing virtual capacity to a service provider, comprising the steps of transmitting a solicitation message from a service provider to a number of third party service providers. Upon acceptance of the solicitation message by one of the third party service providers, the service provider decides whether or not to award the services to the third party service provider. Upon acceptance, the service provider transmits an acceptance message to the third party service provider informing the third party service provider of the acceptance. The service provider then contacts a network management center (NMF) and instructs the NFM to redirect transmissions from a wireless communication device belonging to the third party service provider to the service provider. Messages from the third party service providers are then redirected within the NMF so that they are received by the service provider, and any authorized recipients allowed by the service provider.

In accordance with another embodiment of the invention, an apparatus is provided for providing virtual capacity to a service provider, comprising a service provider dispatch center for transmitting and receiving messages between the service provider and one or more service provider wireless communication devices, a third party service provider having access to a third party wireless communication device for normally transmitting messages to a third party dispatch center, and a network management facility (NMF) for processing messages between the service provider, the service provider wireless communication devices, and the third party wireless communication devices. Information normally transmitted between the third party service provider and the third party dispatch center are temporarily redirected so that the information travels between the third party service provider and the service provider during the length of time that the third party service provider performs services for the service provider.

BRIEF DESCRIPTION OF THE DRAWINGS

The features, objects and advantages of the present invention will become more apparent from the detailed description set forth below when taken in conjunction with the drawings in which like reference characters identify correspondingly similar features throughout various embodiments of the invention, and wherein.

DETAILED DESCRIPTION

The present invention is generally directed to a method and apparatus for providing virtual capacity to a service provider. Virtual capacity is a term used to describe a condition whereby a service provider temporarily expands its capability to perform services by engaging the services of one or more third party service providers. As such, temporary communications between the service provider and the third party service provider are necessary. Various embodiments of the present invention attain this goal. Although the various embodiments of the present invention are described within the context of the freight delivery industry using a satellite-based wireless communication system, it should be understood that the present invention may be used alternatively, or in conjunction with, other communication systems, such as in a terrestrial-based wireless communication system, including cellular, PCS, or GSM terrestrial-based systems, or a data communication network, such as the Internet. In addition, the present invention is not intended to be limited to the trucking industry, but could be used in any industry where the transportation of goods occurs, including the railroad industry, the shipping industry, or the air freight industry. The present invention may also be used in service businesses, more particularly where one contractor, or provider of services, does not have sufficient personnel to perform services which were contracted with a customer, and would have to subsequently arrange for the contracted services to be performed by personnel of another contractor, or provider of services.

Figure 1:
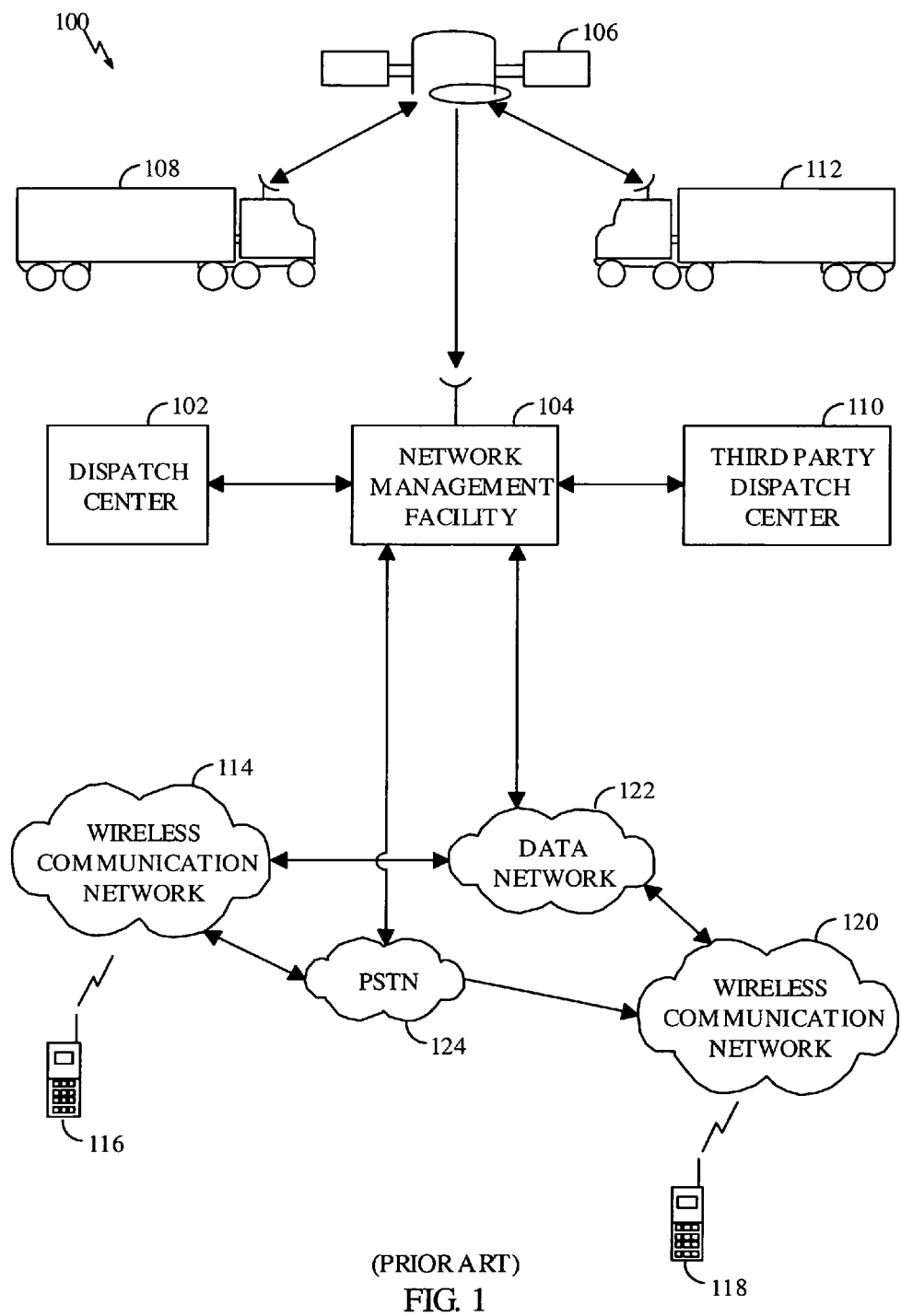
FIG. 1 is an illustration of a satellite communication system in which the embodiments of the present invention may be used.

FIG. 1 is an illustration of a satellite communication system in which an embodiment of the present invention may be used. Satellite communication system 100 comprises a Network Management Facility (NMF) 104 (otherwise known as a central facility or hub), a communication satellite 106, at least one wireless transceiver, or mobile communication terminal (MCT) (not shown), located within, for example, a vehicle 108, and at least one dispatch center, for example, dispatch center 102. Communications in the form of text and/or voice messages may be transmitted between dispatch center 102 and vehicle 108 using NMF 104 and communication satellite 106. The MCT (shown as "202" in FIG. 2 of U.S. Pat. No. 6,124,810) allows messages to be transmitted and received by a vehicle as it travels throughout a large geographical area within the coverage area of satellite 106. The MCT may alternatively comprise a wireless terrestrial communication device, capable of communicating over an analog or digital terrestrial communication system. The MCT typically comprises an interface device (not shown) which displays text messages to one or more vehicle occupants and accepts either voice or text messages to be transmitted to the vehicle's fleet-owned dispatch center.

The MCT may further comprise a digital processor (not shown) which communicates with one or more Electronic Control Units (ECUs not shown) located at various points throughout the vehicle (e.g. vehicle 108). Each ECU provides information relating to the operational performance of vehicle to the digital computer indicating characteristics including, but not limited to, vehicle speed, engine RPM, and miles traveled. It is to be understood that the MCT is well known in the art for providing wireless communications between vehicles and a central station. A second transceiver (not shown) is located within NMF 104 which allows communications to be transmitted and received by NMF 104.

Communication system 100 allows multiple carriers, or service providers, to each communicate with their respective fleet vehicles, while preventing communications from being received by other carriers. For example, in FIG. 1, a third party service provider, or in this example, freight carrier, operates third party dispatch center 110, while a first party carrier, or simply carrier, operates dispatch center 102. Carriers in general typically own a fleet of vehicles for picking up and delivering goods. In the present example, the first party carrier owns vehicle 108 while the third party carrier owns vehicle 112. Communications between dispatch center 102 and vehicle 108 pass through NMF 104 and satellite 106 while communications between third party dispatch center 110 and vehicle 112 likewise pass through NMF 104 and satellite 106. However, each carrier/vehicle cannot intercept or receive the other's communications.

While only two dispatch centers are shown in the communication system of FIG. 1 for purposes of clarity, it is to be understood that in an actual communication system, a large number of dispatch centers, each corresponding to a different carrier/service provider, each having a fleet of vehicles, each vehicle equipped with an MCT, is present in the system. The dispatch centers are able to communicate with their corresponding fleet of vehicles through NMF 104 and satellite 106, however no communications are permitted between the different carriers and their respective vehicles in prior art systems.

The MCT, as indicated, transmits and receives communications wirelessly using, in one embodiment of the invention, the satellite 106. In another embodiment of the invention, the MCT uses any suitable terrestrial wireless communication network, generally illustrated as in FIG. 1 as wireless communication network 114, to communicate with NMF 104, such as an analog or a digital cellular telephone system, or a wireless data communication networks, such as a cellular digital packet data (CDPD) network. As best shown in FIG. 1, the wireless communication network 114 would typically include a transmitting tower functioning as a transmitting intermediary between the vehicle MCTs and NMF 104.

In another embodiment, wireless communication devices (WCDs) may, in addition or alternatively, be used to communicate information between respective dispatch centers and personnel assigned to the WCDs. Such an implementation could be used, for example, in any service-oriented business, such as in a plumbing business or a general contracting business. In this embodiment, WCDs 116 and 118 communicate using wireless communication networks 114 and 120. Wireless communication networks could be the same network, or they may be different networks operating at different frequencies from each other, using different communication protocols, etc. For example, wireless communication network 114 could comprise a CDPD network, while wireless communication network 120 could comprise a cellular PCS digital telephone network.

It should be understood that while FIG. 1 illustrates WCDs 116 and 118 communicating through a terrestrial wireless communication network, they could also communicate via satellite 106 in another embodiment.

In any case, wireless communication networks interface with either data network 122, public switched telephone network (PSTN) 124, or both. Data network 122 comprises any network of digital computing devices and interconnections thereto, such as the Internet. PSTN 124 comprises a terrestrial telephone network, commonly used for voice communications. Data from these networks are routed to NMF 104, generally using terrestrial communication links, although wireless links could be used in the alternative. Again, assuming WCD 116 belongs to a service provider operating dispatch center 102 and further assuming that WCD 118 belongs to a third party service provider operating third party dispatch center 110, communications between WCD 116 and dispatch center 102 are permitted, while communications between WCD 118 and third party dispatch center 110 are permitted. In prior art communication systems, it is generally not possible for information to be received by another party's communication devices.

Regardless of the method of wireless communication employed, customers typically initiate contact with a carrier, for instance through dispatch center 102 of a carrier, for the purpose of picking up goods or freight at one location and delivering the goods or freight to another location, i.e., a destination. The carrier is herein referred to as "the first party". The customer usually comprises an individual, or a business, having goods to ship or wanting goods delivered to it. In another embodiment, the customer comprises an individual or business who is in need of services provided by the carrier, such as plumbing repair or construction, drywall repair or construction, or other services. In yet another embodiment, the customer is an individual or a business seeking to purchase goods or services from another individual or business.

The carrier, or first party, may be a trucking company, a package delivery company, an air cargo delivery company, a rail cargo delivery company, or a marine cargo delivery company, typically comprising an individual or a business for providing transportation services to pick up goods for delivery to a destination, or consignee, or to deliver goods to customers. In another embodiment, the carrier comprises a service company, for example, a general contractor for supplying goods and/or services for a variety of construction/repair needs. In yet another embodiment, the carrier comprises a retail business, such as a pizza delivery company, a flower delivery company, or any kind of merchant who ships goods or provides services to its customers.

One of the functions of dispatch center 102 is to coordinate the activities of its fleet of vehicles, or individual service providers (for example, carpenters, plumbers, etc. using MCTs or WCDs) in order to maximize efficiency and minimize costs. As part of that coordination, information for each fleet-owned MCT/WCD is generated by dispatch center 102 and transmitted to respective vehicles, to WCDs, or to both, as the case may be. As used herein, the term MCT/WCD means either a mobile communication terminal located on or within a vehicle or a wireless communication device, generally a portable transceiver assigned to an individual, rather than to a vehicle. The term MCT/WCD refers to either device.

In one embodiment, vehicles/individuals are normally put into service by a dispatch center sending one or more messages regarding a delivery or a service to be performed. Details of such a delivery or service are provided in an initial message, known as a "load assignment" in the transportation industry. The initial message comprises information necessary for a vehicle operator or service provider to perform the duties requested by dispatch center 102. For example, the initial message may instruct a vehicle operator to pick up goods at a given location and deliver the goods to another location. Or, the initial message may instruct a plumber to go to a location to fix a plumbing-related problem. The initial message may also provide more comprehensive information, such as specific travel routes, actual map coordinates, i.e., latitude and longitude, for each location, an expected time of arrival and/or departure for each location, an average travel time between locations, traffic information, and weather information. Generally, the initial message may comprise any information generated by dispatch center 102 which facilitates the control or monitoring of vehicles and/or WCDs.

The initial message is transmitted to vehicle 108 using NMF 104 and satellite 106 (or transmitting wireless communication network 114, 120), or it may be transmitted to a wireless communication device (WCD) 110, such as a wireless telephone, personal digital assistant, pager, etc., belonging to an individual service provider. The information is received by the MCT onboard vehicle 108 (or WCD 110) and is generally stored in a memory for use by automated onboard electronic systems and/or by the vehicle operator/service provider. In a typical application, the contents of the initial message may be displayed at any time by the vehicle operator/service provider using a display device connected to the MCT, or by using a display which is integrated into the MCT or WCD 110. After viewing the destination information, the vehicle operator/service provider may then proceed to the first location as provided by the initial message.

Occasionally, the service provider, or carrier, associated with dispatch center 102 is not able to meet a request for service due to any number of reasons, including a lack of resources available to carry out the request. For example, a freight delivery company may not have a vehicle available to pick up and deliver goods. Or, a general contractor may not have enough electricians to complete a large project. In this situation, it may be necessary to use the services of a third party in order for the carrier associated with dispatch center 102 to provide the requested services to customers. This would especially be appropriate when the carrier has a pre-existing contractual arrangement with the customer for performing services, such as shipping all freight or goods which a shipper has available for transportation. If the carrier can not provide the services, dispatch center 102 then contacts a third party service provider to make arrangements to provide the requested services. The third party service provider, in one embodiment, includes a third party vehicle 112 for carrying freight or goods. Third party vehicle 112 is equipped with a third party transceiver, or third party mobile communication terminal (MCT) to communicate with third party dispatch center 110. In another embodiment, the third party comprises an individual carrying a WCD. In this case, the carrier contacts the individual using any available means, such as by telephone, by contacting the individual via the WCD, by facsimile, email, etc. to arrange for services to be provided by the third party individual. The third party individual could also comprise a vehicle operator who uses a WCD to communicate with whomever he is performing services for.

After arrangements have been made for the third party service provider to provide services to the carrier, instructions are sent to NMF 104 to have communications from the third party service provider redirected to dispatch center 102. This may be accomplished in any number of ways depending on the type of communication protocol used by NMF 104, dispatch center 102, and/or third party dispatch center 110.

For example, in one embodiment, messages received from a vehicle or a WCD comprise information which allows NMF 104 to identify the intended recipient of the message. Once the identity of the recipient is determined, the message is sent to the recipient, either in the same or substantially the same form as it was received by NMF 104, or by transforming the message into a format compatible with messages for dispatch center 102. For example, each dispatch center connected to NMF 104 could communicate with NMF 104 using a different format or protocol than other dispatch centers. In this case, part of redirecting messages comprises reformatting messages so that they are compatible with the message format for the particular dispatch center that the message is being redirected to.

In one embodiment of the present invention, there is provided a system and method for transporting freight. Based on any number of factors, one of which may be the availability of carrier vehicles, it is determined by the carrier that the freight cannot be transported by the carrier directly. Subsequently, a freight-transportation request is transmitted from the carrier to a third party carrier, and an arrangement, usually contractual, is made whereby the third party carrier agrees to transport the freight, generally in exchange for payment. A vehicle 112 out of a possible number of vehicles in third party carrier's fleet of vehicles may be chosen at the time the agreement is entered to transport the freight, either by the carrier or by the third party carrier. Alternatively, either the carrier or the third party carrier solicits a response from a vehicle in the fleet of third party vehicles to transport the freight. In yet another embodiment, the third party carrier owns no vehicles, but maintains contact with a group of individuals, each owning a vehicle having an MCT. In this embodiment, a solicitation is sent to the group of individuals, generally by telephone, email, facsimile, by posting the freight delivery information on a web-site, or by some other means. In any case, a vehicle operator responds to the solicitation and agrees to transport the freight. The response may be made to either the carrier, the third party carrier, or both, and may be made verbally, for instance by telephone, or by any other known method, such as email, or directly through a web-site.

In yet another embodiment, a solicitation is transmitted directly from the carrier's dispatch center directly to individuals owning or leasing their own transportation vehicle, often known in the industry as owner-operators. The solicitation may be sent to such an individual using any of the above-mentioned methods, or it may be sent to such individuals having a wireless communication device, for example, a wireless telephone capable of receiving data transmissions. One such example of such a wireless telephone is a SCH-X230 model, manufactured by Samsung Electronics, running a standardized applications execution environment, such as the Binary Runtime Environment for Wireless (BREW) platform, developed by QUALCOMN Incorporated.

In such a wireless device, a solicitation for services may be transmitted directly from a dispatch center to an individual carrying such as device. The individual is generally notified by an audio, tactile, or visual alert indicating the reception of the solicitation. The solicitation comprises information relating to the freight to be transported, generally such things as the pick-up and drop off locations for the freight to be transported, the expected pick-up and delivery times, route information, the amount that the carrier is willing to pay for the services, etc. If the individual chooses to accept the solicitation, the individual responds to the solicitation using the wireless communication device, indicating that he/she wishes to transport the freight. The acceptance is transmitted back to the carrier's dispatch center, where it is processed to determine whether or not to allow the responding individual to transport the freight, based on any number of criteria, including whoever responds to the solicitation first. If it is determined to allow the responding individual to transport the freight, an approval message is sent from the dispatch center to the chosen individual awarding the task of freight transportation to the chosen individual. The approval message may in addition comprise additional data relating to the delivery, such as directions to the pick-up and/or drop off destinations.

Once the approval message has been received, the individual carrying the WCD may continue to receive solicitations from other carriers, or, in another embodiment, the carrier who issued the approval may control whether or not the WCD is allowed to receive further solicitations while the individual performs the duties detailed in the solicitation message. In cases where the individual may receive further solicitations, the individual may also respond to solicitations and receive approval messages from other carriers as well. If the individual is associated with a service provider, such as a third party carrier, the service provider may control who may send messages to the WCD by informing NMF 104 of the identities of those who may contact the WCD (or, conversely, those who may not contact the WCD). Similarly, the individual using the WCD can likewise inform NMF 104 of those service providers who may contact the individual and/or those service providers that may not contact the individual.

The MCT/WCD may provide certain status and information relating to the contracted service as the service is performed, for example, the delivery of freight, or the construction of a building. In the case of freight delivery, a vehicle operator generally proceeds to a pick-up location to load the vehicle with the freight identified in the solicitation message. As the vehicle arrives at the pick-up location, a message may be transmitted from the MCT/WCD to the carrier to inform the carrier that the vehicle has arrived at the pick-up location. After the vehicle is loaded, a message may be transmitted to the carrier informing the carrier that the vehicle is loaded and departing the pick-up location. As the vehicle travels towards the destination identified in the solicitation message, information regarding the speed, location, estimated time of arrival, engine performance characteristics, etc. may be transmitted to the carrier. When the vehicle arrives at the destination, another message may be sent, indicating the arrival. After the freight has been taken off of the vehicle, the MCT/WCD may transmit a message to the carrier indicating that the delivery has been completed, and that the MCT/WCD is available to transport another load. It should be understood that the just-described messages may be generated manually by an individual or they may be generated automatically, using a variety of known techniques, for example, techniques disclosed in U.S. Pat. No. 6,124,810 entitled "Method and apparatus for automatic event detection in a wireless communication system", assigned to the assignee of the present invention and incorporated herein.

Messages received from a MCT/WCD may be used by the carrier to provide information to its customer regarding the status and location of the delivery or services. For example, the carrier may operate a website, where customers may access to determine the status and/or location of their goods while in the delivery process. The customer may not be aware that the goods are being carried by a third party.

The last message indicating availability may be transmitted only to the carrier for which the individual has just completed an assignment, or it may be transmitted to other carriers as an indication that the individual is ready to provide services for any service provider (i.e., another carrier). In this case, a single message may be transmitted by the MCT/WCD, including information pertinent to the just-completed delivery, such as the drop-off location, the freight which has been delivered, a purchase order number, etc. In this case, when such a message is received by NMF 104, the message is sent to the carrier associated with the MCT/WCD for the particular service just completed and a second message is sent to other service providers (i.e., dispatch centers) to indicate simply that the MCT/WCD is available to provide service. In this way, only one message needs to be transmitted from a MCT/WCD to inform the carrier pertinent details about the delivery, while keeping the details of the delivery "secret" from other service providers, while still alerting other service providers when the MCT/WCD is available for providing services.

Figure 2:
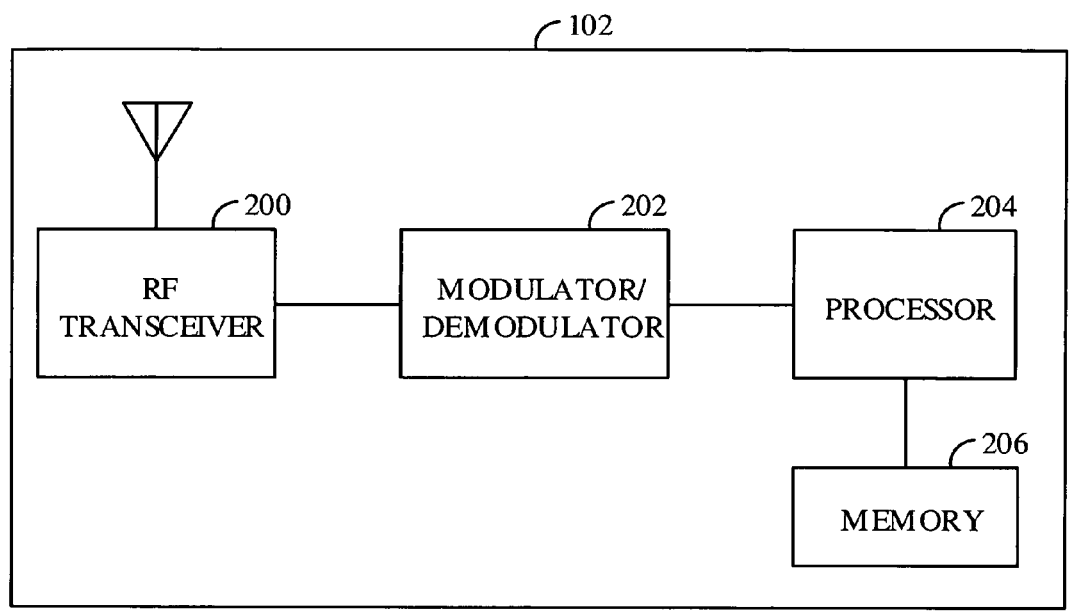
FIG. 2 illustrates a functional block diagram of one embodiment of a representative wireless communication device (WCD) used in the communication system of FIG. 1.

FIG. 2 illustrates a functional block diagram of one embodiment of a representative wireless communication device (WCD) 102. The WCD generally comprises an RF transceiver 200 for transmitting and receiving information, generally voice and data. High frequency communication signals are transmitted/received by RF transceiver 200, which are downconverted into baseband signals during reception and upconverted from baseband to high frequency signals during transmission. WCD 102 also comprises a modulator/demodulator 202 which provides an interface between processor 204 and RF transceiver 200, allowing information from processor 204 to be modulated in accordance with the particular type of wireless communications being used by the WCD, and also to demodulate received information for use by processor 204. Processor 204 controls the various processes and functions of the WCD. Memory 206 is an electronic memory device for storing solicitations, including any information contained within the each solicitation. Memory 206 may also store encoding/decoding instructions for transmitting and receiving messages in a condensed format, as explained below.

One of the functions of processor 204 is for storing and tracking each solicitation received, and for tracking responses to the solicitations. For example, an individual may receive multiple solicitations in a relatively short time period. Each solicitation is received and stored in the memory within the wireless communication device. Responses to the solicitations are transmitted and also kept track of by the processor. For example, an indication may be stored in memory by the processor indicating whether or not a response was transmitted, the time and date of the response, and/or the type of response entered, if one was transmitted (for example, an acceptance of the solicitation, a rejection, or an indication that more information is needed in order to render a decision).

After the freight has been assigned to a vehicle/individual, either the carrier or the third party carrier sends a message to NMF 104 to instruct NMF 104 to redirect messages from and to the chosen vehicle/individual that will be transporting the freight. In one embodiment, messages to/from vehicle 112/WCD 118 are normally routed to third party dispatch center 110 for the benefit of a third party carrier. The redirect message instructs NMF 104 to redirect messages to/from vehicle 112/WCD 118 instead to dispatch enter 102. Generally, once NMF 104 implements the redirection, third party dispatch center can not receive messages from vehicle 112/WCD 118 (although it is feasible that messages could still be transmitted to vehicle 112/WCD 118 from third party dispatch center, or from any other entity, such as a landline telephone, WCD 116, or perhaps another third party carrier transmitting a solicitation to vehicle 112/WCD 118).

Figure 3:
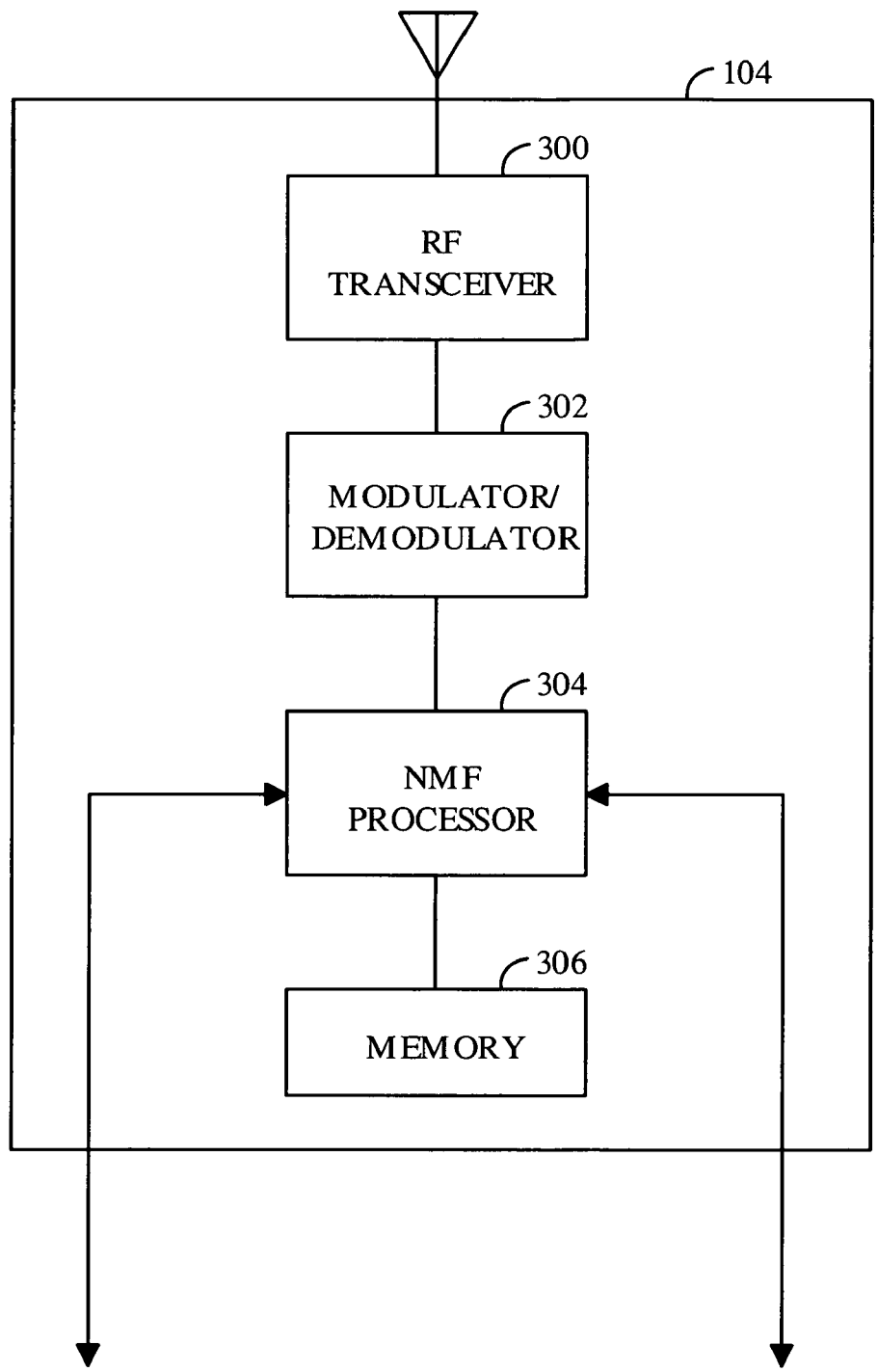
FIG. 3 illustrates a functional block diagram of a network management facility (NMF) used in the communication system of FIG. 1.

FIG. 3 illustrates a functional block diagram of NMF 104. High frequency communication signals are transmitted/received by RF transceiver 300, which are downconverted into baseband signals during reception and upconverted from baseband to high frequency signals during transmission. NMF 104 also comprises a modulator/demodulator 302 which provides an interface between NMF processor 304 and RF transceiver 300, allowing information from processor 304 to be modulated in accordance with the particular type of wireless communications being used by the communication system, and also to demodulate received information for use by NMF processor 304. While only one NMF processor 304 is shown in FIG. 3, typically NMF 104 comprises multiple NMF processors, each, for example, controlling the various communications between a dispatch center and one or more vehicles/WCDs. Therefore, each dispatch center shown in FIG. 1, i.e., dispatch center 102 and third party dispatch center 110, could have its own NMF processor 304 (as well as memory 306).

Memory 306 is an electronic memory device for storing various data relating to communications between a particular dispatch center and various vehicles/WCDs. Types of information stored in memory 306 include information regarding each MCT/WCD under a particular carrier's control, such as a vehicle identification code, an MCT serial number, a WCD electronic serial number (ESN), an individual identification code, such as a social security number or other identification code who is assigned to the MCT/WCD, the status of each MCT/WCD under control of the carrier, etc. Other information that may be stored in memory 306 include instructions for encoding/decoding messages. For example, messages to/from vehicles/WCDs within dispatch center 102's control may require messages to be encoded/decoded in one way while messages to/from vehicles/WCDs within dispatch center 110's control may require messages to be encoded/decoded in a different way.

In one embodiment, messages lengths are shortened by using a "form" message, commonly referred to as a "macro" message. For example, each dispatch center may create a number of macro messages, each message for relaying certain information, such as the status or location of a MCT/WCD, or instructions from the dispatch center. Each macro is generally assigned a macro number to differentiate it from other macros. For example, macro #001 from dispatch center 102 may indicate that a vehicle has departed from a pick-up location with a full load of freight. In this case, the only information transmitted by the vehicle is the macro number and position information. When NMF 104 receives this information, NMF processor 304 decodes the message by applying predefined decoding instructions as stored in memory 306. It is then forwarded to the dispatch center (in another embodiment, NMF processor 304 simply forwards the encoded macro message to the dispatch center, where the decoding instructions are applied at the dispatch center).

As messages are passed through NMF 104 from dispatch center 102 to WCD 118, for example, the messages may have to be reformatted to comply with the decoding instructions present at either end of the communication link (i.e., NMF 104, dispatch center 102, or WCD 118). Therefore, a message which has been encoded by dispatch center 102 and sent to NMF 104, intended for WCD 118, may have to be reformatted to comply with the decoding instructions present within WCD 118. In this example, upon receipt of a message from dispatch center 102 intended for WCD 118, NMF processor 304 determines whether or not the message must be reformatted, generally by consulting memory 306 for a code associating WCD 118's encoding/decoding instructions and a code associating dispatch center 102's encoding/decoding instructions. If there is a difference between the codes, meaning that there is a difference in the encoding/decoding instructions, then NMF processor 304 reformats the message for use by WCD 118. A similar process takes place for messages sent from WCD 118 to dispatch center 102, or, generally, to any other entity, such as third party dispatch center 112, or WCD 116.

NMF processor may also be used to provide billing services for dispatch center 102 while a third party MCT/WCD is performing services for the dispatch center. In this embodiment, after a message instructing NMF 104 to reroute messages from WCD 118 to dispatch center 102 is received by NMF processor 304, for example, processor 304 begins tracking any billing information pertaining to WCD 118 so that the charges may be applied to an account owned by the carrier associated with dispatch center 102. When services have been completed by WCD 118, a message is transmitted by WCD 118 to NMF 104, where it is received by NMF processor 304. Upon receipt, NMF processor 304 may discontinue charging the carrier's account based on messages transmitted from WCD 118.

In general, messages transmitted by a MCT/WCD may be designated as certain "types" for routing purposes. For example, a message indicating that a load has been picked up may be designated as a message intended only for the carrier for which the MCT/WCD is presently providing services. Other messages, such as a message containing only position information, may be delivered to more than one entity, generally under the control of the carrier for which services are presently being carried out.

The present invention can also be applied to any service-based industry, for example, the construction industry. A general contractor may need to hire numerous, temporary workers of various disciplines to complete a job for a customer. The general contractor may solicit workers using the just-described system of transmitting a solicitation to any person having a WCD, computer, telephone, etc. After the solicitations are received and acceptances generated by various individuals, the general contractor chooses one or more individuals and notifies those individuals that they have been selected to provide services to the general contractor. A message is then transmitted, typically by the general contractor, to NMF 104 to inform NMF 104 that messages to and from the chosen WCDs should be sent and received to/from the general contractor. The chosen individuals may then transmit status or other types of information to the general contractor while performing services for the general contractor. Once the services have been provided, the individual is generally free to provide services for other general contractors.

Figure 4:
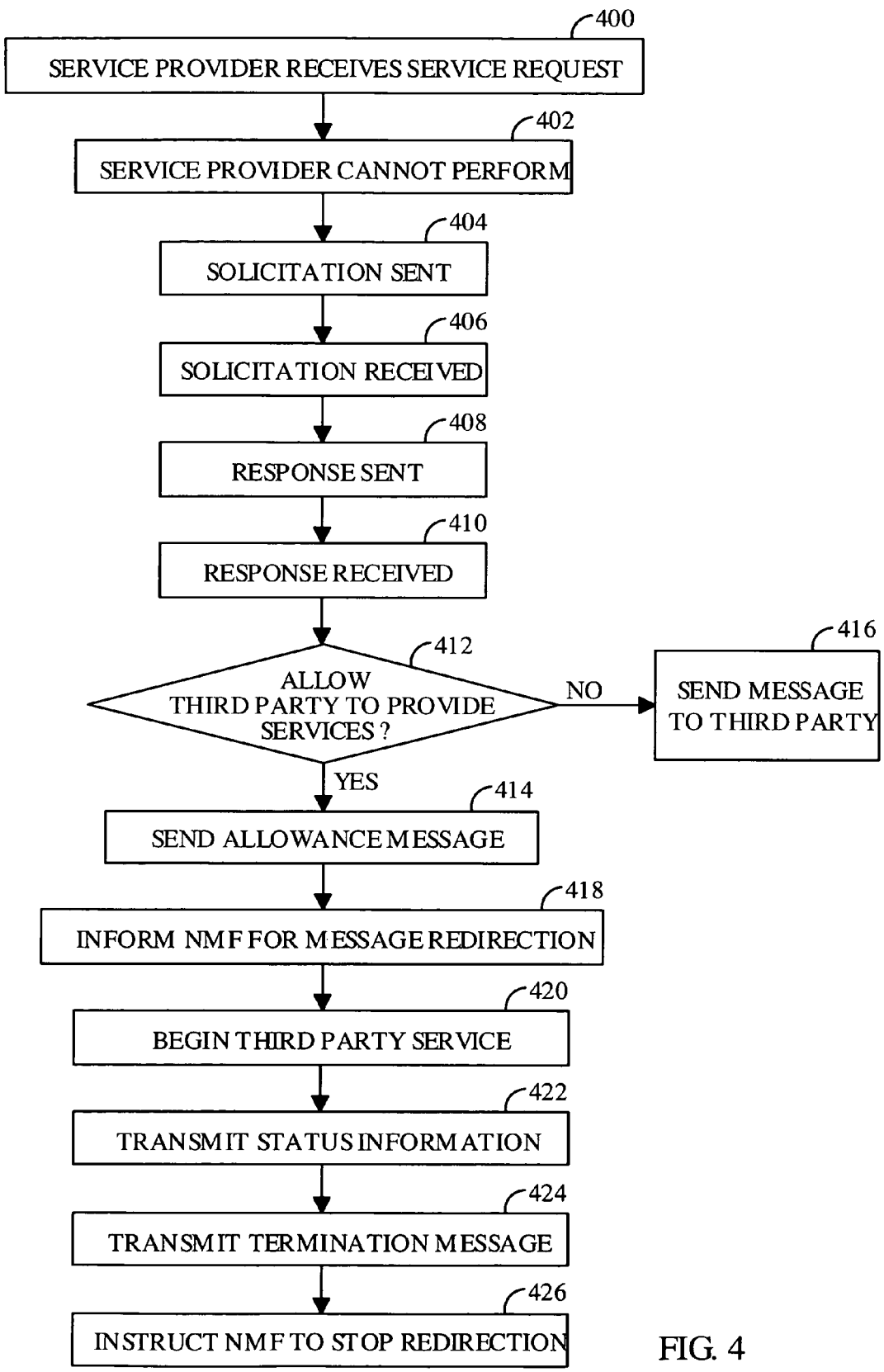
FIG. 4 is a flow diagram illustrating one embodiment of the present invention.

FIG. 4 is a flow diagram illustrating one embodiment of the present invention. In step 400, a customer of a service provider contacts the service provider to arrange for services to be provided by the service provider. At step 402, the service provider determines that it does not have the ability to provide the services that were promised to the customer. Consequently, at step 404, a solicitation message is transmitted from a dispatch center associated with the service provider, for example, dispatch center 102, to any number of potential third party service providers (i.e. individuals or other service providers) in a wireless communication system, for example a satellite based communication system or a terrestrial wireless communication system. The solicitation message provides details of the service that is to be provided for the customer.

In step 406, a third party service provider having access to a wireless communication device receives the solicitation message. In step 408, the third party service provider responds to the solicitation with an acceptance message, indicating that he/she/it desires to provide the requested service(s) to the service provider. In step 410, the service provider receives the acceptance from the third party service provider and in step 412 determines whether or not to allow the third party service provider to provide the needed services. If the service provider allows the third party service provider to provide the service(s), an approval message is transmitted to the chosen third party service provider, shown in step 414, informing him/her/it that he/she/it has been chosen to provide the requested service(s). If the service provider does not chose the third party service provider to provide the services, a message is generally transmitted to the third party service provider, shown in step 416, informing him/her/it of the decision.

In step 418, a message is sent, generally from the service provider, to NMF 104 informing NMF 104 that the chosen third party service provider is going to provide services to the service provider, and therefore, messages from the third party service provider should be routed to the service provider until further notice. In step 420, the third party service provider begins performing the requested service(s). As the third party service provider performs the service(s), status and/or location information is generally transmitted to the service provider by the third party service provider via NMF 104, as shown in step 422. After the service(s) have been completed, a message is transmitted from the third party service provider to the service provider indicating same, as shown in step 424. At that point, the third party service provider may provide service to the service provider again, or it may provide service (s) to another entity, such as a different service provider. If no other services are needed by the service provider, a message is sent to NMF 104, generally from dispatch center 102, indicating that messages from the third party service provider should no longer be redirected to dispatch center 102, as shown as step 426.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope and spirit of the invention as set forth. Therefore, many modifications may be made to adapt a particular situation or material to the teachings of the invention without departing from the essential scope and spirit of the present invention. It is intended that the invention not be limited to the particular embodiment disclosed as the best mode contemplated for carrying out this invention, but that the invention will include all embodiments and equivalents falling within the scope of the appended claims.

We claim:

1. A method for providing personnel to furnish services comprising the following steps:
    (a) determining that first personnel of a first group are not available to provide services to a requestor of services;
    (b) determining that second personnel of a second group can perform the services requested by the requestor;
    (c) assigning the second personnel to perform services requested by the requestor, wherein the second personnel communicates using a wireless communications device;
    (d) configuring communications, using a processor, at a control center to route communications between the wireless communications device and the requestor through the control center; and
    (e) receiving a service status communication from the second personnel for transmission to the requestor.

2. A method for providing personnel to furnish services as recited in claim 1 wherein communications to the requestor occur through an intermediary.

3. A method as recited in claim 2 wherein the intermediary is a dispatch center.

4. A method as recited in claim 3 wherein communications routed between the dispatch center and the wireless communications device comprise macro messages.

5. A method as recited in claim 4 wherein said macro messages are presented to in formats corresponding to the respective dispatch center and the wireless communications device.

6. A method as recited in claim 1 wherein communications between the wireless communications device and the requestor consist of wireless satellite communications, wireless terrestrial-based communications, or a combination thereof.

7. The method of claim 1 further comprising reconfiguring communications at the control center, subsequent to the receipt of the service status communication, in order to prevent subsequent communications between the wireless communications device and the requestor.

8. A method for allocating services comprising the following steps:
    (a) providing a first organization having first personnel to perform services for a requestor of the services and having a first personnel control center for communicating with the first personnel;
    (b) determining that the first personnel of the first organization are not available to provide services requested by the requestor;
    (c) providing a second organization having second personnel which arc capable of performing the services requested by the requestor, wherein the second personnel communicates using a wireless communications device;
    (d) determining that the second personnel of the second organization are available to perform the services requested by the requestor;
    (e) assigning the second personnel to perform the services requested by the requestor;
    (f) configuring, in connection with using a programmed processor, the first personnel control center to route communications between the wireless communication device and the requestor; and
    (g) communicating a service status from the second organization to the first personnel control center, wherein the first personnel control center communicates the service status to the requestor.

9. The method of claim 8 wherein said first personnel control center comprises a personnel dispatch center.

10. The method of claim 8 wherein said first personnel control center comprises a personnel network management facility.

11. The method of claim 8 which further comprises reconfiguring communications at the first personnel control center, subsequent to the receipt of the service status, in order to prevent subsequent communications between the wireless communications device and the requestor.

12. An apparatus for providing personnel to furnish services, comprising:
    a processor for receiving a request for services from a requestor, for determining that first personnel of a first group are not available to provide the requested services to the requestor, for determining that second personnel of a second group can provide the requested services to the requestor, for assigning the second personnel to provide the requested services to the requestor, and for configuring communications at a control center to route communications between the requestor and a wireless communications device associated with the second personnel through the control center;

a transceiver for receiving a service status communication from the second personnel for transmission to the requestor; and a memory for storing information pertaining to the wireless communications device associated with the second personnel.

13. The apparatus of claim 12, wherein communications to the requestor occur through an intermediary.

14. The apparatus of claim 13, wherein the intermediary is a dispatch center.

15. The apparatus of claim 14, wherein communications routed between the dispatch center and the wireless communications device comprise macro messages.

16. The apparatus of claim 15, wherein the macro messages are presented to in formats corresponding to the respective dispatch center and the wireless communications device.

17. The apparatus of claim 12, wherein the processor is further for reconfiguring communications at the control center, subsequent to the receipt of the service status communication, in order to prevent subsequent communications between the requestor and the wireless communications device.

18. An apparatus for providing personnel to furnish services, comprising:

means for receiving a request for services from a requestor, determining that first personnel of a first group are not available to provide the requested services to the requestor, determining that second personnel of a second group can provide the requested services to the requestor, assigning the second personnel to provide the requested services to the requestor, and configuring communications at a control center to route communications between the requestor and a wireless communications device associated with the second personnel through the control center;

means for receiving a service status communication from the second personnel for transmission to the requestor; and means for storing information pertaining to the wireless communications device associated with the second personnel.

19. The apparatus of claim 18, further comprising means for reconfiguring communications at the control center, subsequent to the receipt of the service status communication, in order to prevent subsequent communications between the requestor and the wireless communications device.

* * * * *

UNITED STATES PATENT AND TRADEMARK OFFICE
CERTIFICATE OF CORRECTION

| | | |
|---|---|---|
| PATENT NO. | : 7,711,591 B2 | Page 1 of 1 |
| APPLICATION NO. | : 11/492630 | |
| DATED | : May 4, 2010 | |
| INVENTOR(S) | : Wolfe et al. | |

It is certified that error appears in the above-identified patent and that said Letters Patent is hereby corrected as shown below:

Column 14, line 33, claim 8: "arc" to read as --are--

Signed and Sealed this
First Day of May, 2012

David J. Kappos
*Director of the United States Patent and Trademark Office*